United States Patent
Cummings (12)

(10) Patent No.: US 6,724,173 B2
(45) Date of Patent: *Apr. 20, 2004

(54) CIRCUITS, APPARATUSES, ELECTROCHEMICAL DEVICE CHARGING METHODS, AND LITHIUM-MIXED METAL ELECTRODE CELL CHARGING METHODS

(75) Inventor: John Cummings, Round Rock, TX (US)

(73) Assignee: Valence Technology, Inc., Henderson, NV (US)

( * ) Notice: Subject to any disclaimer, the term of this patent is extended or adjusted under 35 U.S.C. 154(b) by 147 days.

This patent is subject to a terminal disclaimer.

(21) Appl. No.: 10/071,843

(22) Filed: Feb. 8, 2002

(65) Prior Publication Data

US 2003/0151391 A1 Aug. 14, 2003

(51) Int. Cl.[7] .................................................. H02J 7/00
(52) U.S. Cl. ...................................................... 320/134
(58) Field of Search ............................... 320/134, 116, 320/118, 120, 121, 132, DIG. 18; 307/100, 33; 323/268; 327/584; 361/18, 56, 88, 91.6

(56) References Cited

U.S. PATENT DOCUMENTS

| | | | | |
|---|---|---|---|---|
| 3,237,078 A | * | 2/1966 | Mallory | 320/122 |
| 5,821,733 A | * | 10/1998 | Turnbull | 320/116 |
| 5,831,416 A | * | 11/1998 | Fisher | 320/132 |
| 5,982,144 A | * | 11/1999 | Johnson et al. | 320/122 |

OTHER PUBLICATIONS

U.S. patent Ser. No. 09/484,799; entitled "Lithium–based Active Materials and Preparation Thereof"; Jeremy Barker; filed Jan. 18, 2000.

U.S. patent application Ser. No. 10/071,850; entitled "Electrical Power Source Apparatuses, Circuits Electrochemical Device Charging Methods, and Methods of Charging a Plurality of Electrochemical Devices"; John Cummings; filed Feb. 8, 2002.

* cited by examiner

Primary Examiner—Edward H. Teo
Assistant Examiner—Pia Tibbits
(74) Attorney, Agent, or Firm—Well St. John, P.S.

(57) ABSTRACT

Circuits, apparatuses, electrochemical device charging methods, and lithium-mixed metal electrode cell charging methods are provided. According to one aspect, a circuit includes charging circuitry adapted to apply electrical energy to an electrochemical device to charge the electrochemical device, and the electrochemical device being configured to assume an open-circuit condition in a substantially charged state; shunting circuitry electrically coupled with the charging circuitry and configured to shunt the electrical energy around the electrochemical device responsive to the electrochemical device reaching the substantially charged state; and indication circuitry configured to output a signal responsive to the shunting of the electrical energy to indicate a charge status of the electrochemical device.

31 Claims, 2 Drawing Sheets

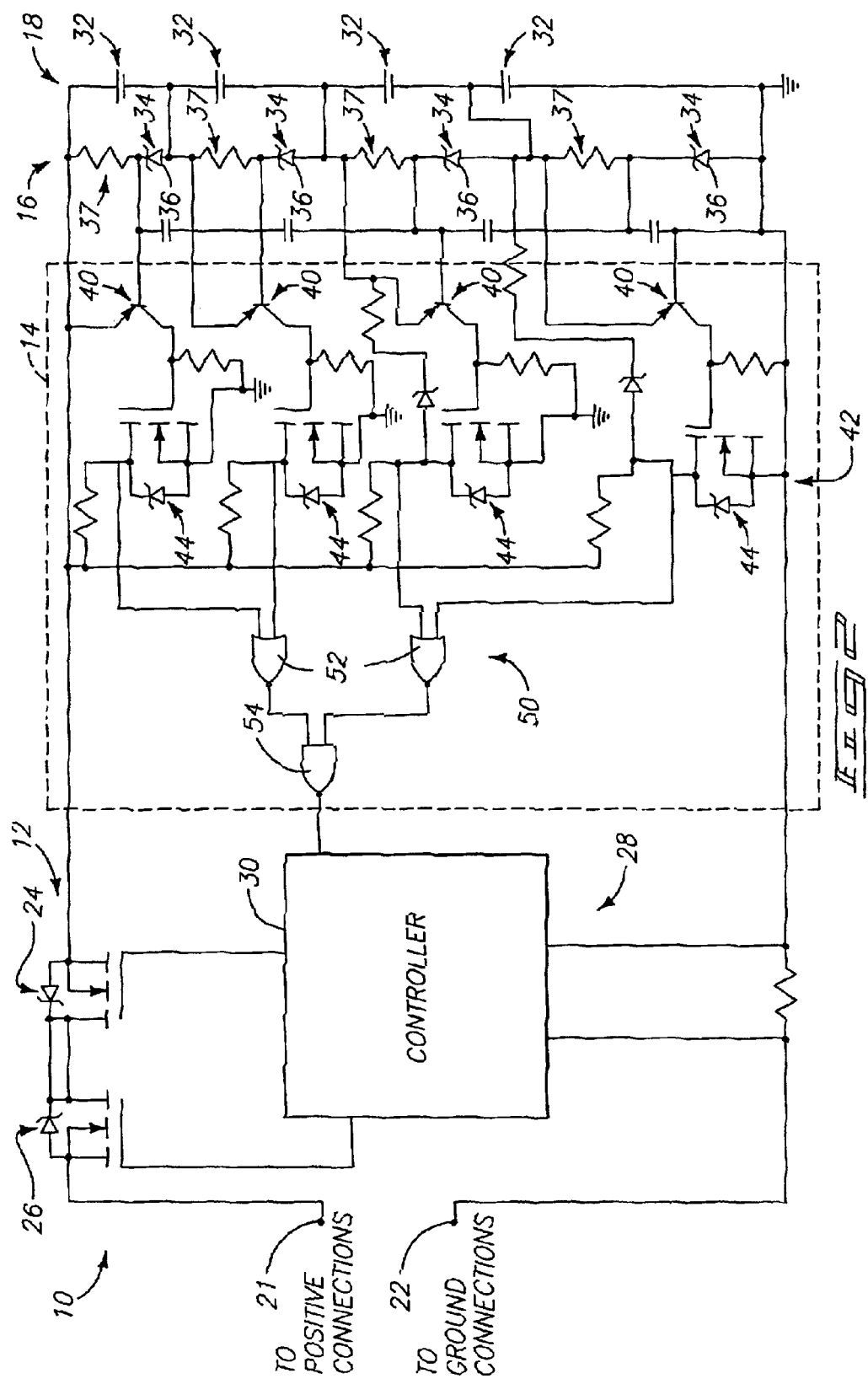

CIRCUITS, APPARATUSES, ELECTROCHEMICAL DEVICE CHARGING METHODS, AND LITHIUM-MIXED METAL ELECTRODE CELL CHARGING METHODS

TECHNICAL FIELD

This invention relates to circuits, apparatuses, electrochemical device charging methods, and lithium-mixed metal electrode cell charging methods.

BACKGROUND OF THE INVENTION

The sophistication and uses of electrical devices have increased dramatically in recent years. Consumer items having electrical components are ubiquitous in communications, computing, entertainment, etc. The size of mobile telephones, notebook computers, music players, and other devices has continued to decrease while the capabilities and quality of the devices continues to increase as modern electronic components used in such devices are developed and improved upon.

Numerous people rely upon or have grown accustomed to usage of electrical consumer devices for business, education, or for other needs. Electronic consumer devices are increasingly portable to accommodate these needs during travels from home or the workplace. The sophistication and capabilities of power supplies, such as batteries, for such devices have also improved to meet the requirements of the electronic consumer devices. For example, cost, size, and capacity are some product characteristics which have been improved for the portable power supplies for electronic applications. There is a desire to provide improved devices and methodologies for maintaining and charging power supplies.

BRIEF DESCRIPTION OF THE DRAWINGS

Preferred embodiments of the invention are described below with reference to the following accompanying drawings.

FIG. 2 is a schematic diagram depicting components shown in FIG. 1 according to one exemplary embodiment.

DETAILED DESCRIPTION OF THE PREFERRED EMBODIMENTS

Figure 1:
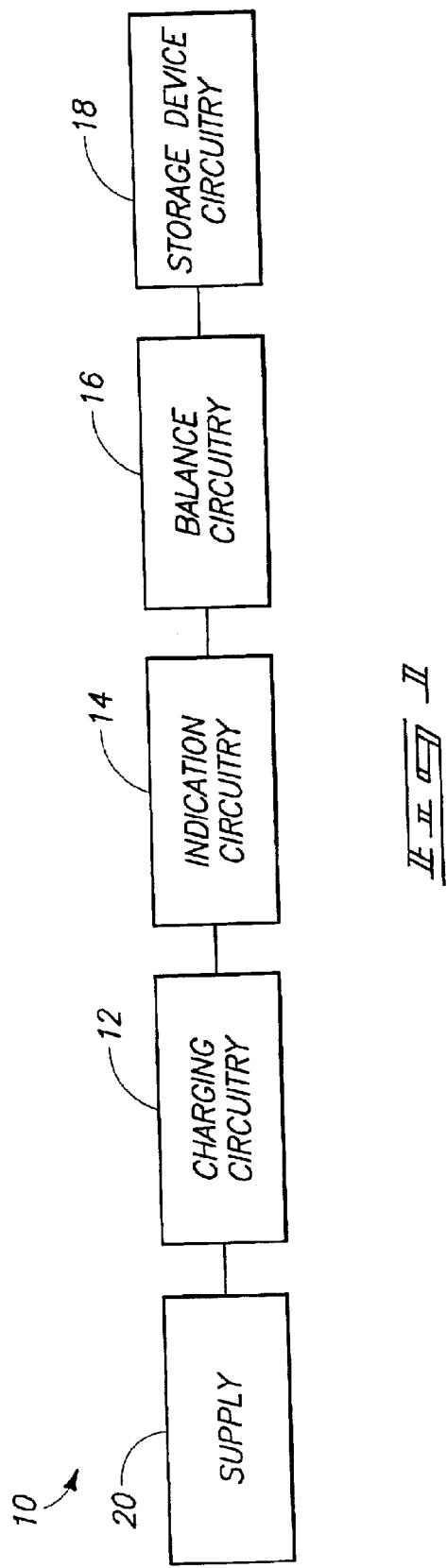
FIG. 1 is a functional block diagram depicting components of an exemplary power supply apparatus.

This disclosure of the invention is submitted in furtherance of the constitutional purposes of the U.S. Patent Laws "to promote the progress of science and useful arts" (Article 1, Section 8).

According to one aspect of the invention, a circuit comprises charging circuitry adapted to apply electrical energy to an electrochemical device to charge the electrochemical device, and the electrochemical device being configured to assume an open-circuit condition in a substantially charged state; shunting circuitry electrically coupled with the charging circuitry and configured to shunt the electrical energy around the electrochemical device responsive to the electrochemical device reaching the substantially charged state; and indication circuitry configured to output a signal responsive to the shunting of the electrical energy to indicate a charge status of the electrochemical device.

According to a second aspect of the invention, an apparatus comprises means for applying electrical energy to an electrochemical device to charge the electrochemical device; means for passively shunting the electrical energy around the electrochemical device responsive to the electrochemical device being substantially charged; and means for indicating a state of charge of the electrochemical device responsive to the electrical energy being passively shunted around the electrochemical device.

Another aspect of the invention provides an electrochemical device charging method comprising providing an electrochemical device having an end-of-charge charge voltage; applying electrical energy having a voltage greater than the end-of-charge charge voltage to the electrochemical device to charge the electrochemical device and to provide the electrochemical device in an over-voltage condition; shunting the electrical energy around the electrochemical device provided in the over-voltage condition; and detecting the shunting of the electrical energy to provide state of charge information of the electrochemical device.

According to another aspect, an electrochemical device charging method comprises providing a plurality of electrically coupled electrochemical devices; applying electrical energy to the electrochemical devices to charge the electrochemical devices; shunting the electrical energy around at least one of the electrochemical devices responsive to the at least one electrochemical device reaching a predefined state of charge; and indicating the shunting to indicate a state of charge of the at least one electrochemical device.

Another aspect provides an electrochemical device charging method comprising providing a plurality of electrically coupled electrochemical devices; applying electrical energy to the electrochemical devices to charge the electrochemical devices, and wherein the electrochemical devices individually assume an open-circuit condition responsive to being substantially charged; and indicating individual ones of the electrochemical devices obtaining a substantially charged state responsive to respective individual ones of the electrochemical devices assuming the open-circuit condition.

Yet another aspect provides a lithium-mixed metal electrode cell charging method comprising providing a plurality of series-coupled lithium cells individually having a lithium-mixed metal electrode, wherein the cells are individually configured to assume an open-circuit condition responsive to being substantially charged; applying electrical energy to the lithium cells to charge the lithium cells; passively shunting the electrical energy around individual ones of the lithium cells which have assumed the open-circuit condition, wherein the passively shunting comprises shunting using a breakdown device; indicating the shunting; ceasing the applying responsive to the indicating and responsive to all of the lithium cells being substantially charged; and electrically isolating positive terminals of the lithium cells after the ceasing.

FIG. 1 illustrates exemplary components of a power supply apparatus 10. The exemplary apparatus 10 includes charging circuitry 12, indication circuitry 14, balance circuitry 16 and storage device circuitry 18. The depicted apparatus 10 is configured to couple with an external supply 20 and is configured to receive electrical energy from supply 20. Supply 20 may be implemented as any convenient source of electrical energy, such as a utility line, generator, alternator, etc. In some arrangements, a rectifier (not shown) may be utilized to provide direct current electrical energy if supply 20 is arranged to provide alternating current electrical energy.

Power supply apparatus 10 is configured to store electrical energy for use in associated electronic devices (not shown).

Power supply apparatus 10 may be conveniently used to supply electrical energy to portable electronic devices, such as mobile telephones, notebook computers, music players, personal digital assistants (PDAs), or other electronic devices.

Charging circuitry 12 is adapted to receive electrical energy from supply 20 and to apply electrical energy to storage device circuitry 18 to maintain and\or charge storage device circuitry 18. As discussed further below, exemplary implementations of charging circuitry 12 include switching circuitry configured to selectively apply electrical energy to storage device circuitry 18.

Indication circuitry 14 is configured to indicate a charge status of storage device circuitry 18. As described in further detail below, indication circuitry 14 is configured to monitor a state of charge of storage device circuitry 18 and to indicate information regarding the monitored state of charge.

Balance circuitry 16 is configured to apply electrical energy from supply 20 to storage device circuitry 18 to implement charging and/or maintenance operations. According to one embodiment, balance circuitry 16 is configured to assure substantial or full charging of individual devices (exemplary devices are shown in FIG. 2) of storage device circuitry 18 and to implement shunting operations responsive to devices of circuitry 18 obtaining a substantially charged state. Balance circuitry 16 also implements isolation operations to maintain the charge of the devices.

Further details regarding one possible implementation of balance circuitry 16 are discussed in a co-pending U.S. patent application entitled "Electrical Power Source Apparatuses, Circuits, Electrochemical Device Charging Methods, and Methods of Charging a Plurality of Electrochemical Devices," filed the same day as the present application, naming John Cummings as inventor, assigned to the assignee of the present invention, having assignee docket number VT-2424, having attorney docket number VA16-006, and incorporated herein by reference.

Storage device circuitry 18 includes one or more storage device configured to store electrical energy. The storage device(s) may be individually implemented as an electrochemical device in one possible arrangement. As discussed further below, an exemplary configuration of storage device circuitry 18 includes a plurality of series-coupled electrochemical cells arranged to form a battery.

According to aspects of the invention, electrochemical devices of storage device circuitry 18 are individually configured to impede current flow as the device approaches a substantially charged state. Such electrochemical devices are individually configured to assume an open-circuit condition in a substantially charged state.

Exemplary configurations of electrical energy storage devices comprising electrochemical devices include lithium cells individually having a lithium-mixed metal electrode. Further details regarding an exemplary lithium cell having a lithium-mixed metal electrode are discussed in U.S. patent application Ser. No. 09/484,799, entitled "Lithium-based Active Materials and Preparation Thereof", listing Jeremy Barker as an inventor, filed Jan. 18, 2000, assigned to the assignee of the present invention, and incorporated herein by reference. Lithium cells having lithium-mixed metal electrodes are individually configured in at least one arrangement to provide a voltage of approximately 3.7 Volts (also referred to as an end-of-charge voltage) in a substantially charged state or condition.

Referring to FIG. 2, further details are described with respect to an exemplary schematic representation of power supply apparatus 10 in accordance with aspects of the invention. A power node 21 and a ground node 22 are provided to couple with respective power connections and ground connections. For example, power node 21 and ground node 22 may be coupled with supply 20 of FIG. 1 to receive electrical energy. Power node 21 and ground node 22 may be further coupled to supply electrical energy to an exemplary load comprising associated application circuitry (e.g., mobile telephone circuitry, PDA circuitry, notebook computer circuitry, etc.). In one arrangement, nodes 21, 22 may be first coupled with supply 20 during charging operations of storage device circuitry 18 and thereafter nodes 21, 22 may be coupled with an appropriate load to supply electrical energy thereto.

As shown in FIG. 2, an exemplary configuration of charging circuitry 12 is electrically coupled with power node 21. The exemplary charging circuitry 12 includes a charge device 24 and discharge device 26 individually comprising a switch, such as a field effect transistor (FET). Charge device 24 is configured to cease the application of electrical energy to storage device circuitry 18. For example, in one exemplary embodiment, device 24 is configured to cease the application of electrical energy responsive to a received external control signal. As described further below and according to exemplary aspects of the invention, charge device 24 is configured to cease the application responsive to a signal generated within indication circuitry 14 indicating a predetermined (e.g., substantially or fully charged) charge status of electrochemical devices of storage device circuitry 18. Discharge device 26 is arranged to cease discharging of electrical energy from storage device circuitry 18 to a coupled load responsive to electrochemical devices of storage device circuitry 18 being discharged to a predetermined state (e.g., substantially discharged).

The depicted embodiment of power supply apparatus 10 of FIG. 2 further includes control circuitry 28 coupled with indication circuitry 14, charge device 24 and discharge device 26. In one exemplary configuration, control circuitry 28 is implemented as a controller 30, such as a battery microcontroller. A suitable controller comprises a model M37515 or M37516 available from Mitsubishi Electric and Electronics U.S.A., Inc. In general, control circuitry 28 is configured to monitor and control charging, discharging and/or maintenance operations of storage device circuitry 18.

According to exemplary operational aspects, control circuitry 28 is configured to receive signals from indication circuitry 14 indicating state of charge information of storage device circuitry 18 and control circuitry 28 is configured to control the operation of charge device 24 and\or discharge device 26 responsive to the signal received from indication circuitry 14 indicating the status of circuitry 18. For example, during charging operations and responsive to control circuitry 28 receiving an appropriate indication signal (e.g., indicating devices of circuitry 18 are substantially charged) from circuitry 14, control circuitry 28 opens charge device 24 to cease the application of electrical energy to storage device circuitry 18.

Electrical energy utilized to charge storage device circuitry 18 is applied via balance circuitry 16 to storage device circuitry 18. In the depicted exemplary embodiment, storage device circuitry 18 includes four electrochemical devices 32. Individual electrochemical devices 32 include a positive terminal and negative terminal as shown. Exemplary electrochemical devices 32 comprise cells arranged in series to provide storage device circuitry 18 comprising a battery. As mentioned above, electrochemical devices 32 may be implemented as lithium cells individually having a lithium-mixed metal electrode. Other arrangements of storage device circuitry 18 are possible including more, less or other cells.

Balance circuitry 16 is arranged to properly charge individual electrochemical devices 32. Balance circuitry 16 includes shunting circuitry 34 electrically coupled with charging circuitry 12 and configured to shunt electrical energy around respective electrochemical devices 32 responsive to the respective electrochemical devices reaching a predefined state of charge (e.g., a substantially charged state). As shown, shunting circuits 34 are individually coupled in parallel with a respective device 32. Individual circuits 34 are coupled between a positive terminal of the respective device 34 and a positive terminal of a subsequent electrochemical device 32 or ground. Shunting circuitry 34 is configured to shunt electrical energy around respective electrochemical devices 32 being at least substantially charged.

In one embodiment, shunting circuitry 34 is implemented as a plurality of passive devices, such as breakdown devices. In the depicted embodiment, shunting circuitry 34 is implemented as a plurality of zener diodes 36. Shunting circuitry 34 implemented as passive circuitry is configured to implement shunting operations without associated control circuitry. Other arrangements of shunting circuitry 34 are possible.

During exemplary charging operations, the voltages of respective electrochemical devices 32 increase as the devices become charged. Once a given electrochemical device 32 obtains a substantially charged state, it resists or impedes current flow and assumes an open-circuit condition. A breakdown threshold voltage of a zener diode 36 comprising shunting circuitry 34 may be selected to conduct current responsive to the voltage of the respective electrochemical device 32 increasing to a predetermined level, for example, corresponding to the device 32 having obtained a substantially charged state.

In one example, electrochemical devices 32 implemented as lithium cells having a lithium-mixed metal electrode may provide a voltage of approximately 3.7 Volts in a substantially or fully charged state (3.7 Volts is the end-of-charge voltage). Electrical energy utilized to charge storage device circuitry 18 may be provided at a voltage of approximately 4.3 Volts/cell via nodes 21, 22. Accordingly, shunting circuitry 34 implemented as zener diodes 36 may individually have a breakdown voltage threshold of approximately 3.9 Volts. Responsive to a respective electrochemical device 32 obtaining a substantially charged state (and assuming an open-circuit condition), a respective zener diode 36 is triggered and the electrical energy is shunted from the respective substantially charged electrochemical device 32 to a subsequent electrochemical device 32 or ground.

In one embodiment, electrical energy having a voltage greater than an end-of-charge voltage of individual electrochemical devices 32 is applied to charge devices 32. Such electrical energy is applied before and after a device 32 assumes an open-circuit condition, provides the device in an overvoltage condition, and results in the triggering of the respective shunting circuit 34 for the device 32 provided in the overvoltage condition which shunts the electrical energy to a subsequent device 32 or ground. Accordingly, shunting circuitry 34, implemented as zener diodes 36 in one arrangement, conducts current when respective electrochemical devices 32 coupled in parallel with the shunting circuitry 34 reach a substantially fully charged state and assume an open-circuit condition. Other configurations of zener diodes 36 having other breakdown threshold voltages may be utilized to define other voltages wherein shunting is provided according to other inventive aspects.

Indication circuitry 14 and control circuitry 28 are arranged to provide a full-charge detection circuit in the depicted exemplary configuration of FIG. 2. A plurality of bipolar junction transistors (BJTs) 40, implemented as PNP devices in the depicted embodiment, are coupled with respective shunting circuits 34 as shown in FIG. 2. Transistors 40 operate to conduct current responsive to respective ones of shunting circuits 34 conducting current. Transistors 40 are triggered responsive to voltage drops occurring across limiting resistors 37 during conduction of current in the respective shunting circuits 34.

Level shifter circuitry 42 and logic circuitry 50 are further provided to implement charge monitoring and control operations. Level shifter circuitry 42 is coupled intermediate transistors 40 and logic circuitry 50 and comprises a plurality of n-channel field effect transistors (FETs) 44. Logic circuitry 50 includes a plurality of NOR devices 52 coupled with a NAND device 54 in the exemplary configuration. The depicted circuitry configurations are exemplary to illustrate inventive aspects of the present application and other circuit configurations are possible.

During charging operations of an electrochemical device 32, the respective field effect transistor 44 applies a logic-high signal to a respective NOR device 52. When the electrochemical device 32 assumes an open-circuit condition responsive to achieving a substantially charged state, the respective field effect transistor 44 applies a logic low signal to the respective NOR device 52 responsive to the respective shunting device 34 and transistor 40 conducting current. Accordingly, when all electrochemical devices 32 assume an open-circuit condition responsive to being at least substantially charged, the respective field effect transistors 44 apply logic-low signals to NOR devices 52. When all inputted signals comprises logic-low signals, NAND device 54 outputs a logic-low signal. For all other conditions, NAND device 54 outputs a logic-high signal.

Accordingly, when the outputted signal from NAND device 54 assumes a logic-low state, an indication is provided that all of the electrochemical devices 32 have been at least substantially charged. Controller detects electrochemical devices 32 being at least substantially charged using the indication from NAND device 54.

Following reception of an appropriate indication signal from NAND device 54 indicating all electrochemical devices 32 have been substantially charged, controller 30 in one arrangement controls charge device 24 to cease application of electrical energy to storage device circuitry 18. Accordingly, indication circuitry 14 is arranged in the depicted embodiment to indicate a state of charge of one or more electrochemical device 32 responsive to electrical energy being passively shunted around one or more electrochemical device 32. Control circuitry 28 is configured to control the charge device 24 to cease the application of the electrical energy responsive to the electrical energy being shunted around all of the electrochemical devices 32 responsive to an indication that all of the electrochemical devices 32 have obtained a substantially charged state (e.g., electrochemical devices 32 have assumed a substantially open-circuit state indicating substantial or full-charging thereof). Accordingly, state of charge information of an electrochemical device 32 is provided responsive to detection of shunting of electrical energy around the respective device 32 in one aspect of the invention.

Following removal of the electrical energy using charge device 24, shunting circuits 34 assume non-conducting states of operation. Shunting circuits 34 being provided in non-conducting states operate to electrically isolate respective positive terminals of electrochemical devices 32 after the application of the electrical energy has been ceased to prevent or minimize discharging of electrical energy.

At least some aspects of the present invention utilize fundamental characteristics of electrochemical devices 32 individually configured to assume an open-circuit condition responsive to being provided in a substantially charged state. Such characteristics can be utilized to provide charge detection and to provide charge control operations according to inventive aspects of the present invention. Aspects of the present invention enable state of charge monitoring and control without monitoring averaging taper current. Aspects of the invention also permit monitoring without waiting for cells to polarize following disablement of a charge FET to determine whether voltages of the cells fall below an end-of-charge level.

The present invention may be utilized with any number of electrochemical devices 32. The four cell implementation described with reference to FIG. 2 is exemplary and other configurations are possible. Balance circuitry 16 and indication circuitry 14 may be modified to accommodate alternative arrangements of electrochemical devices 32 within storage device circuitry 18 to provide state of charge monitoring, indication and control.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A circuit comprising:
    charging circuitry adapted to apply electrical energy to an electrochemical device to charge the electrochemical device, and the electrochemical device being configured to assume an open-circuit condition in a substantially charged state;
    shunting circuitry electrically coupled with the charging circuitry and configured to shunt the electrical energy around the electrochemical device responsive to the electrochemical device reaching the substantially charged state; and
    indication circuitry configured to output a signal responsive to the shunting of the electrical energy to indicate a charge status of the electrochemical device.

2. The circuit of claim 1 wherein the charging circuitry comprises a switch, and further comprising control circuitry coupled with the indication circuitry and configured to control the switch to cease the application of the electrical energy to the electrochemical device responsive to the signal from the indication circuitry.

3. The circuit of claim 2 wherein the shunting circuitry is configured to electrically isolate a positive terminal of the electrochemical device after the application of the electrical energy has been ceased.

4. The circuit of claim 2 wherein the charging circuitry is configured to apply the electrical energy to a plurality of electrochemical devices, the shunting circuitry is configured to shunt the electrical energy around respective ones of the electrochemical devices, and the control circuitry is configured to control the switch to cease the application of the electrical energy responsive to the electrical energy being shunted around all of the electrochemical devices.

5. The circuit of claim 1 wherein the shunting circuitry comprises a passive shunting device configured to shunt the electrical energy without the use of control circuitry.

6. The circuit of claim 1 wherein the shunting circuitry comprises a breakdown device.

7. The circuit of claim 1 wherein the shunting circuitry comprises a zener diode.

8. The circuit of claim 1 further comprising the electrochemical device.

9. The circuit of claim 8 wherein the electrochemical device comprises a lithium cell having a lithium-mixed metal electrode.

10. An apparatus comprising:
    means for applying electrical energy to an electrochemical device to charge the electrochemical device;
    means for passively shunting the electrical energy around the electrochemical device responsive to the electrochemical device being substantially charged; and
    means for indicating a state of charge of the electrochemical device responsive to the electrical energy being passively shunted around the electrochemical device.

11. The apparatus of claim 10 further comprising means for ceasing application of the electrical energy to the electrochemical device.

12. The apparatus of claim 11 wherein the means for passively shunting the electrical energy further comprise means for electrically isolating a positive terminal of the electrochemical device responsive to ceasing the application.

13. The apparatus of claim 10 further comprising the electrochemical device.

14. The apparatus of claim 13 wherein the electrochemical device comprises a lithium cell having a lithium-mixed metal electrode.

15. An electrochemical device charging method comprising:
    providing an electrochemical device having an end-of-charge charge voltage;
    applying electrical energy having a voltage greater than the end-of-charge charge voltage to the electrochemical device to charge the electrochemical device and to provide the electrochemical device in an over-voltage condition;
    shunting the electrical energy around the electrochemical device provided in the over-voltage condition; and
    detecting the shunting of the electrical energy to provide state of charge information of the electrochemical device.

16. The method of claim 15 further comprising ceasing the applying responsive to the detecting.

17. The method of claim 16 further comprising electrically isolating a positive terminal of the electrochemical device after the ceasing.

18. The method of claim 15 wherein the shunting comprises shunting using a passive device.

19. The method of claim 15 wherein the providing comprises providing a lithium cell having a lithium-mixed metal electrode.

20. An electrochemical device charging method comprising:
    providing a plurality of electrically coupled electrochemical devices;

applying electrical energy to the electrochemical devices to charge the electrochemical devices;

shunting the electrical energy around at least one of the electrochemical devices responsive to the at least one electrochemical device reaching a predefined state of charge; and indicating the shunting to indicate a state of charge of the at least one electrochemical device.

21. The method of claim 20 wherein the shunting comprises shunting around all of the electrochemical devices responsive to all of the electrochemical devices reaching the predefined state of charge, and the indicating comprises indicating the shunting around all of the electrochemical devices, and further comprising ceasing the applying responsive to the indicating the shunting of the electrical energy around all of the electrochemical devices.

22. The method of claim 20 further comprising electrically isolating a positive terminal of the at least one electrochemical device after the ceasing.

23. The method of claim 20 wherein the shunting comprises shunting using a passive shunting device.

24. The method of claim 20 wherein the providing comprises providing a plurality of lithium cells individually having a lithium-mixed metal electrode.

25. An electrochemical device charging method comprising:

providing a plurality of electrically coupled electrochemical devices;

applying electrical energy to the electrochemical devices to charge the electrochemical devices, and wherein the electrochemical devices individually assume an open-circuit condition responsive to being substantially charged; and indicating individual ones of the electrochemical devices obtaining a substantially charged state responsive to respective individual ones of the electrochemical devices assuming the open-circuit condition.

26. The method of claim 25 further comprising ceasing the applying responsive to an indication that all of the electrochemical devices have obtained the substantially charged state.

27. The method of claim 26 further comprising electrically isolating positive terminals of the electrochemical devices after the ceasing.

28. The method of claim 25 further comprising shunting the electrical energy around individual ones of the electrochemical devices which have assumed the open-circuit condition.

29. The method of claim 28 wherein the shunting comprises shunting using a passive device.

30. The method of claim 25 wherein the providing comprises providing a plurality of lithium cells individually having a lithium-mixed metal electrode.

31. A lithium-mixed metal electrode cell charging method comprising:

providing a plurality of series-coupled lithium cells individually having a lithium-mixed metal electrode, wherein the cells are individually configured to assume an open-circuit condition responsive to being substantially charged;

applying electrical energy to the lithium cells to charge the lithium cells;

passively shunting the electrical energy around individual ones of the lithium cells which have assumed the open-circuit condition, wherein the passively shunting comprises shunting using a breakdown device;

indicating the shunting;

ceasing the applying responsive to the indicating and responsive to all of the lithium cells being substantially charged; and electrically isolating positive terminals of the lithium cells after the ceasing.

* * * * *

UNITED STATES PATENT AND TRADEMARK OFFICE
CERTIFICATE OF CORRECTION

PATENT NO. : 6,724,173 B2  Page 1 of 1
DATED : April 20, 2004
INVENTOR(S) : John Cummings It is certified that error appears in the above-identified patent and that said Letters Patent is hereby corrected as shown below:

<u>Column 6,</u>
Line 43, please insert -- 30 -- after "Controller".

Signed and Sealed this

Sixteenth Day of November, 2004

JON W. DUDAS
*Director of the United States Patent and Trademark Office*